United States Patent [19]

McClure et al.

[11] Patent Number: 5,033,548

[45] Date of Patent: Jul. 23, 1991

[54] PROCESS TO IMPROVE HYDROCARBON RECOVERY BY DECREASING INJECTION SOLUTION VISCOSITY AND IMPROVING SOLUTION SCREEN FACTOR

[75] Inventors: D. Craig McClure, Parker, Colo.; Gregory Ulizio, Vincennes, Ind.

[73] Assignee: Marathon Oil Company, Findlay, Ohio

[21] Appl. No.: 579,132

[22] Filed: Sep. 6, 1990

[51] Int. Cl.$^5$ ............................................. C21B 43/22
[52] U.S. Cl. ................................... 166/274; 166/275; 252/8.554
[58] Field of Search ...................... 166/273, 274, 275; 252/8.554

[56] References Cited

U.S. PATENT DOCUMENTS

| | | | |
|---|---|---|---|
| 3,684,014 | 8/1972 | Norton et al. | 166/275 |
| 3,768,560 | 10/1973 | Hill et al. | 166/274 |
| 4,212,748 | 7/1980 | Ferrell et al. | 252/8.554 |
| 4,287,950 | 9/1981 | Baker et al. | 166/273 |
| 4,353,806 | 10/1982 | Canter et al. | 252/8.554 |
| 4,360,061 | 11/1982 | Canter et al. | 166/274 |
| 4,676,316 | 6/1987 | Mitchell | 166/274 |

OTHER PUBLICATIONS

R. R. Jennings et al., "Factors Influencing Mobility Control by Polymer Solution", SPE Paper No. 2867, 9th Biennial Production Techniques Symposium, Wichita Falls, Texas, May 14-15, 1970.

R. D. Sydansk, "Acrylamide-Polymer/Chromium-(III)-Carboxylate Gels for Near Wellbore Matrix Treatments", SPE/DOE Paper No. 20214, SPE/DOE 7th Symposium for Enhanced Oil Recovery, Tulsa, Oklahoma, Apr. 22-25, 1990.

Primary Examiner—George A. Suchfield
Attorney, Agent, or Firm—Jack L. Hummel; Jack E. Ebel

[57] ABSTRACT

An aqueous solution comprised of partially hydrolyzed polyacrylamide and an ethoxylated alcohol, is injected into a subterranean hydrocarbon bearing formation via an injection well followed by injection of a drive fluid. The solution displaces hydrocarbons from formation pores and the drive fluid pushes the displaced hydrocarbon and the aqueous solution toward a production well enhancing hydrocarbon production. The ethoxylated alcohol decreases solution viscosity and increases solution screen factors resulting in improved injectivity, improved mobility control and ultimately improved hydrocarbon production.

22 Claims, 2 Drawing Sheets

Volume % $C_8$ 6.0 EO
(OCTANOL ETHOXYLATED WITH 6 MOLES OF ETHYLENE OXIDE)

(OCTANOL ETHOXYLATED WITH 6 MOLES OF ETHYLENE OXIDE)

PROCESS TO IMPROVE HYDROCARBON RECOVERY BY DECREASING INJECTION SOLUTION VISCOSITY AND IMPROVING SOLUTION SCREEN FACTOR

FIELD OF THE INVENTION

The invention relates to a process wherein an aqueous polymer solution is injected into a subterranean hydrocarbon-bearing formation followed by a drive fluid. The aqueous solution displaces hydrocarbons from formation pores and a drive fluid pushes the displaced hydrocarbon and aqueous solution toward a production well where the hydrocarbons are produced. The aqueous solution comprises partially hydrolyzed polyacrylamide and an ethoxylated alcohol. The ethoxylated alcohol simultaneously decreases solution viscosity and increases solution screen factor resulting in improved solution injectivity, improved solution mobility control and ultimately improved hydrocarbon production.

BACKGROUND OF THE INVENTION

Description of Related Art

Hydrocarbons within a subterranean formation are normally removed from the formation by primary recovery methods which employ naturally occurring water or gas pressure found within the formation to carry hydrocarbons to the earth's surface. When naturally occurring formation pressure is insufficient or formation pressure has been depleted by hydrocarbon production, secondary recovery methods must be used to produce hydrocarbons from the formation.

One type of secondary recovery is the use of soluble or miscible phase displacement techniques wherein aqueous solutions are injected into wells which are in fluid communication with hydrocarbon bearing subterranean formations. The solutions are soluble or miscible with the hydrocarbons and cause the hydrocarbons to be displaced from the pores within the formation. Once displaced, the hydrocarbons are pushed toward production wells by drive fluids. A common problem with these types of hydrocarbon recovery methods are that aqueous solutions often have poor injection profiles due to low solution viscosity. Low viscosity results in fingering and a reduction of hydrocarbon recovery.

The ability of a solution to finger through a formation is dependent on fluid "mobility". A laboratory method for obtaining a measure of the relative mobility of solutions is described in the American Institute of Mining Engineers' paper "Factors Influencing Mobility Control by Polymer Solution" by R. R. Jennings, J. H. Rogers, and T. J. West, SPE Paper No. 2867 prepared for the Ninth Biennial Production Techniques Symposium, held in Wichita Falls, Tex. May 14–15, 1970. In this method, the solution to be tested flows through screens and the ratio of the time required for the test solution to flow through the "screen viscometer" divided by the time required for a standard solvent (water) to flow through the viscometer is termed the "screen factor". Screen factors indicate the effectiveness of a solution's mobility control. The greater the screen factor the better the mobility control.

Generally, mobility control in a waterflood is achieved by addition of polymers to increase the viscosity of the aqueous solution. The increased viscosity decreases the channeling of the aqueous solution through the formation, and thereby improves the efficiency of oil recovery from the production well. However, the greater the screen factor and mobility control the more difficult an aqueous solution is to inject due to increased solution viscosity. Additionally, increasing solution viscosity often causes plugging within the subterranean formation due to coagulated polymeric materials blocking the pores within the formation. To mitigate the problem of formation plugging, it is common in the industry to filter the aqueous polymer solution to remove the coagulated polymers prior to injection into the formation.

The use of aqueous solutions of polymeric materials injected into a subterranean hydrocarbon-bearing formations via injection wells to enhance recovery of hydrocarbons from production wells is well known in the art. Also well known is the addition of various organic chemicals to the aqueous polymeric solutions to achieve either changes in viscosity or changes in filterability. U.S. Pat. No. 4,212,748 to Ferrell et al. discloses a method for improving polymer augmented waterflood filterability by addition of sulfated ethoxylated alcohol and an ethoxylated alcohol to the polymer solution. The method enhances filterability of the aqueous solution so that it possesses improved injectivity characteristics when used as a formation waterflood. U.S. Pat. No. 4,676,316 to Mitchell discloses a process for preinjecting an aqueous solution of water-soluble polymer and an anionic surfactant into a hydrocarbon bearing formation followed by injection of a gas. The surfactant improves both mobility and profile control of the aqueous polymer solution and thereby improves hydrocarbon recovery.

The Ferrell patent recognized that filterability of flood solutions are improved by adding both sulfated ethoxylated alcohol and ethoxylated alcohols to the waterflood. The Mitchell patent recognized that nonionic surfactants such as alcohol ethoxylates improved mobility and profile control in a gas flooding process. However, neither these patents have recognized that when ethoxylated alcohols are added to aqueous solutions of partially hydrolyzed polyacrylamides that the solution screen factor increases (i.e. solution mobility control improves, mobility is decreased and fingering is decreased) at the same time that viscosity decreases (i.e. filterability improves). Accordingly, it is an object of this invention to present a method to reduce fingering within a waterflood and improve injectivity by simultaneously increasing the screen factor and decreasing viscosity of an aqueous PHPA solution. The improved injectivity and screen factors result in improved recovery of hydrocarbons from the formation by reducing the difficulty of injecting the aqueous solution into the formation and improving the mobility control of the aqueous solution as it displaces hydrocarbons toward the production well.

SUMMARY OF THE INVENTION

A method to improve hydrocarbon recovery from a subterranean hydrocarbon bearing formation by sequential injection of an aqueous solution and drive fluid into an injection well in fluid communication with said subterranean hydrocarbon-bearing formation. The aqueous solution displaces hydrocarbons from formation pores and the drive fluid pushes the displaced hydrocarbon and aqueous solution toward a production well where the hydrocarbons are recovered. The aqueous solution is comprised of partially hydrolyzed polyacrylamide and an ethoxylated alcohol. The ethoxylated alcohol decreases the solution viscosity and increases the solution screen factor. The partially hydrolyzed polyacrylamide has a molecular weight range of about 1 million to 20 million, and is hydrolyzed from about 0.1 mole % to about 50 mole %. The ethoxylated alcohol has a base chain length of about 1 to about 20 carbons and is ethoxylated with about 1 to about 16 moles of ethylene oxide to about 1 mole of alcohol. The aqueous solution has improved injection characteristics and screen factors which result in higher hydrocarbon recoveries than are obtainable when non-ethoxylated alcohol solutions are used in a waterflood.

DETAILED DESCRIPTION OF THE PREFERRED EMBODIMENTS

To utilize this invention an aqueous solution of polyacrylamide and ethoxylated alcohol followed by an aqueous drive fluid are injected via an injection well into a subterranean, hydrocarbon-bearing formation. The formation is penetrated by at least one injection well and at least one spaced-apart production well which are in fluid communication with the subterranean formation. The invention may be utilized in any type of injection/production well system such as an inverted five spot pattern or other well patterns or systems as is well known in the art of hydrocarbon recovery.

The aqueous solution comprises a polyacrylamide having a molecular weight in the range of about 1 million to about 20 million and preferably about 5 million to about 15 million and most preferably about 8 million to about 11 million. The polyacrylamide is preferably hydrolyzed from about 0.1 mole % to about 50 mole % and preferably from about 10 mole % to 40 mole % and most preferably about 20 mole % to 30 mole %. The polyacrylamide can be present in the aqueous solution from about 100 ppm to about 3000 ppm, preferably from about 200 ppm to about 2000 ppm and most preferably from about 300 ppm to about 1500 ppm.

The ethoxylated alcohol has a base chain of about 1 to about 20 carbons and preferably about 3 to about 15 carbons and most preferably about 6 to about 10 carbons. It is ethoxylated in the range of ratios of about 1 mole of alcohol to 1 mole of ethoxylation to about 1 mole of alcohol to 36 moles of ethoxylation, preferably about 1 mole of alcohol to about 2 moles of ethoxylation to about 1 mole of alcohol to about 16 moles of ethoxylation and most preferably about 1 mole of alcohol to about 2 moles of ethoxylation to about 1 mole of alcohol to about 10 moles of ethoxylation.

The concentration of ethoxylated alcohol in the aqueous solution is about 0.1% to about 5%, preferably from about 0.25% to about 4% and most preferably from about 0.5% to about 2% by volume. The aqueous solvent is fresh water or brine with a total dissolved solids content up to the solubility limit of the solid in water.

The drive fluid is water or brine with a total dissolved solids content up to the solubility limit of the solid in water.

The practice of this invention is best illustrated by specific examples. For this reason the following examples are presented; however, they are not to be construed as limiting the scope of the invention.

EXAMPLE 1

One percent by volume quantities of isopropyl, butyl and amyl alcohol are added to three samples containing 750 ppm of 30% partially hydrolyzed polyacrylamide in fresh water. No change in viscosity or screen factor is noted in any of the three samples.

EXAMPLE 2

Figure 1:
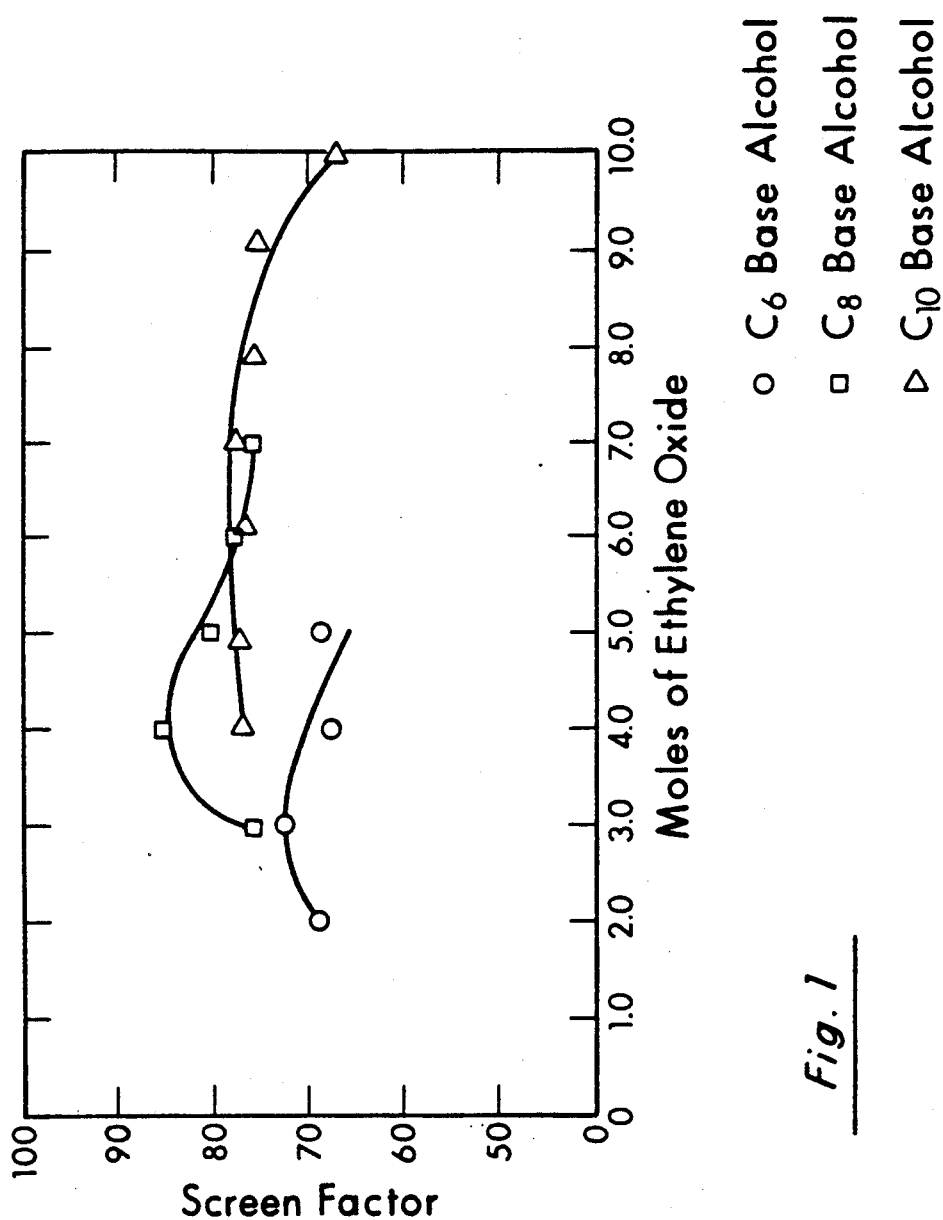
FIG. 1 is a plot of screen factor verses moles of ethylene oxide used to ethoxylate one percent volumes of hexanol, octanol and decanol which are added to an aqueous solution containing 750 ppm of 30% partially hydrolyzed polyacrylamide.

One percent by volume of ethoxylated hexanol, octanol and decanol were added to samples containing 750 ppm of 30 mole % partially hydrolyzed polyacrylamide in fresh water. The results are shown in FIG. 1. These samples show that the greater the base chain alcohol length, the greater the ethoxylation range exhibiting an increase in screen factor and that the maximum screen factor occurs with ethoxylated octanol. Additionally, all three series exhibited maximum screen factors which correspond with the mid-point Hydrophillic-Lyrophillic Balance (HLB) value for each base chain. HLB values are part of a 1–40 numerical scale developed by W. C. Griffin and presented in the *Journal of Cosmetic Chemistry* 1, (1949) 3111, which indicates a chemical's emulsification behavior in polar and non-polar solvents. These results indicate that a base chain alcohol with any HLB faction can be used in this invention so long as it is ethoxylated to approximately a neutral HLB value prior to addition to the aqueous solution that is injected into the formation.

EXAMPLE 3

Figure 2:
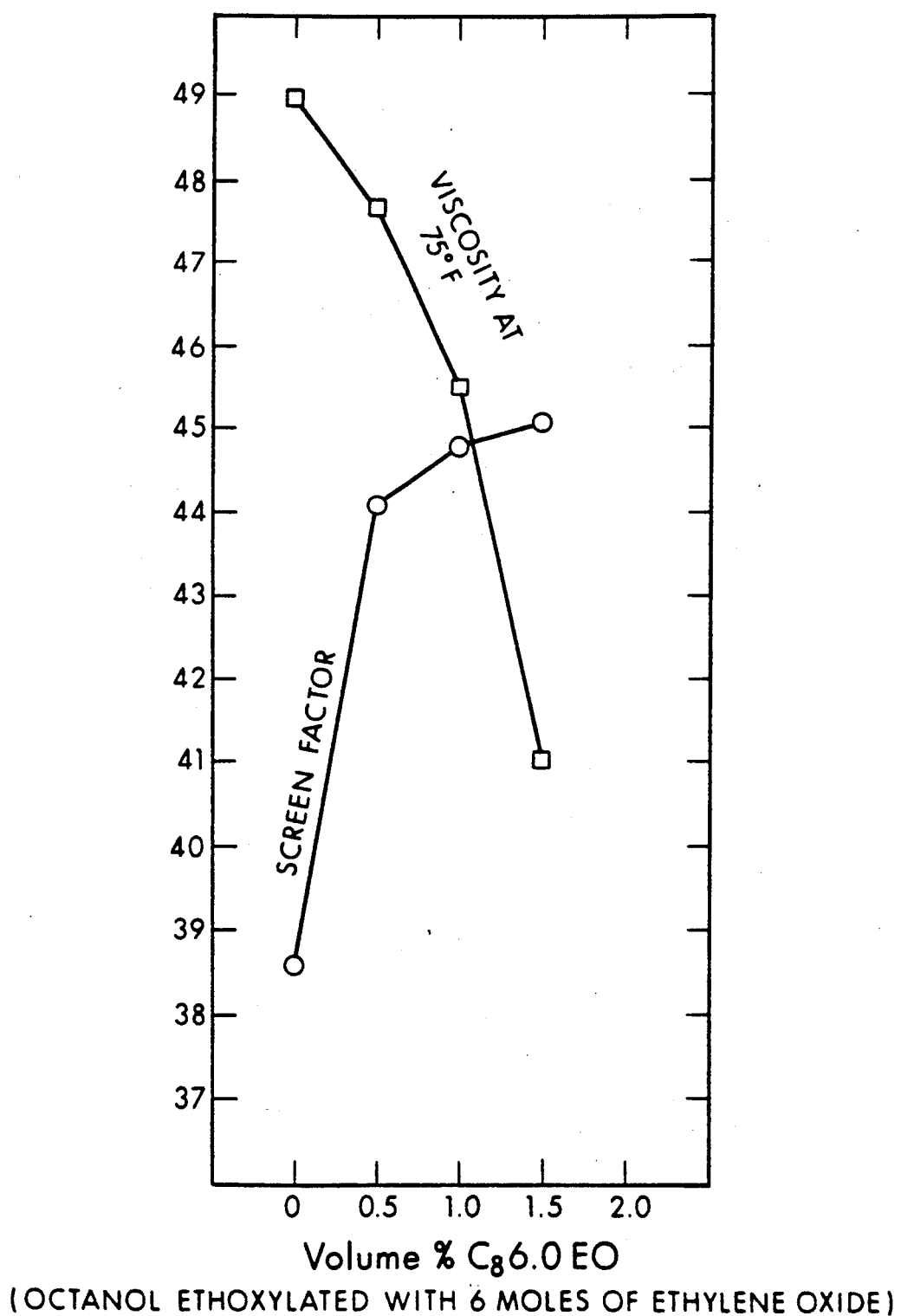
FIG. 2 is a plot of screen factor and viscosity verses various volumes of octanol, ethoxylated by a ratio of 1 mole of octanol to 6 moles of ethylene oxide, which are added to a 750 ppm solution of 11 million MW, 30 mole % partially hydrolyzed polyacrylamide in fresh water.

A 750 ppm aqueous solution containing 30% partially hydrolyzed polyacrylamide with a molecular weight of 11 million is mixed with various volumes of octanol which is ethoxylated by a ratio of 1 mole of octanol to 6 moles of ethylene oxide. Lower solubility limits of the alcohol in the aqueous solution are 2 moles for hexanol, 3 moles for octanol and 4 moles for decanol. Viscosity and screen factors are measured and plotted against the volume of ethoxylated alcohol and are shown in FIG. 2. Maximum screen factors are obtained with ethoxylated octanol. As shown by the figure, viscosity decreases and screen factor increases as the percent volume of ethoxylated alcohol increases. The simultaneous effect of increased screen factor and decreased viscosity is theorized to be the result of two different resonance bondings happening simultaneously between amide-/ethylene oxide and the alcohol base chain/alcohol base chain.

Thus, increased screen factors indicate that mobility control is improved and decreased viscosity indicates that injectivity is improved by addition of ethoxylated alcohol to aqueous solutions thickened by partially hydrolyzed polyacrylamide. These results also show that any base chain alcohol can be used with any HLB value so long as the base chain alcohol is ethoxylated to a neutral HLB value prior to addition to the aqueous solution. This is important as a cost reduction measure since the cheapest HLB base chain alcohol available can be obtained, ethoxylated, and then used for the polymer flood.

While the foregoing preferred embodiments of the invention have been described and shown, it is understood that the alternatives and modifications such as those suggested and others, may be made thereto and fall within the scope of the invention.

We claim:

1. A process for recovery of hydrocarbons from a subterranean hydrocarbon-bearing formation having an injection well in fluid communication with a production well, the process comprising:

preparing at the surface an aqueous solution comprised of partially hydrolyzed polyacrylamide and an ethoxylated alcohol;

injecting said aqueous solution into said formation via said injection well; and displacing said aqueous solution by a drive fluid toward the production well.

2. The method in claim 1 wherein the molecular weight of said partially hydrolyzed polyacrylamide is in the range of about 1 million to 20 million.

3. The method of claim 2 wherein the molecular weight of said partially hydrolyzed polyacrylamide is about 5 million to about 15 million.

4. The method of claim 3 wherein the molecular weight of said partially hydrolyzed polyacrylamide is about 8 million to about 11 million.

5. The method of claim 1 wherein the percent hydrolysis of said partially hydrolyzed polyacrylamide is in the range of about 0.1% to about 50%.

6. The method of claim 5 wherein the percent hydrolysis of said partially hydrolyzed polyacrylamide is about 10% to about 40%.

7. The method of claim 6 wherein the percent hydrolysis of said partially hydrolyzed polyacrylamide is about 20 mole % to about 30 mole %.

8. The method of claim 1 wherein said ethoxylated alcohol has a base chain length of 1 to 20 carbons.

9. The method of claim 8 wherein said ethoxylated alcohol has a base chain length of 3 to 15 carbons.

10. The method of claim 9 wherein said ethoxylated alcohol has a base chain length of 6 to 10 carbons.

11. The method of claim 1 wherein said ethoxylated alcohol is ethoxylated in the range of ratios of about 1 mole of alcohol to 1 mole of ethoxylation to about 1 mole of alcohol to 36 moles of ethoxylation.

12. The method of claim 11 wherein said ethoxylated alcohol is ethoxylated in the range of about 1 mole of alcohol to 2 moles of ethoxylation to about 1 mole of alcohol to 16 moles of ethoxylation.

13. The method of claim 12 wherein said ethoxylated alcohol is ethoxylated in the range of about 1 mole of alcohol to 2 moles of ethoxylation to about 1 mole of alcohol to 10 moles of ethoxylation.

14. The method of claim 11 wherein said ethoxylated alcohol has an 8 carbon base chain and is ethoxylated with 4 moles of ethoxylate.

15. The method of claim 11 wherein said ethoxylated alcohol is ethoxylated to achieve the mid point Hydrophillic-Lyrophillic Balance factor for the base chain of said ethoxylated alcohol.

16. The method of claim 1 wherein the concentration of said ethoxylated alcohol in said aqueous solution is about 0.1% to about 5% by volume.

17. The method of claim 16 wherein the concentration of said ethoxylated alcohol in said aqueous solution is about 0.25% to about 4% by volume.

18. The method of claim 17 wherein the concentration of said ethoxylated alcohol in said aqueous solution is about 0.5% to about 2% by volume.

19. The method of claim 1 wherein the concentration of said partially hydrolyzed polyacrylamide in said solution is about 100 ppm to about 3000 ppm.

20. The method of claim 19 wherein the concentration of said partially hydrolyzed polyacrylamide is about 200 ppm to about 2000 ppm.

21. The method of claim 20 wherein the concentration of said partially hydrolyzed polyacrylamide is about 300 ppm to about 1500 ppm.

22. The method of claim 1 wherein said displacement fluid is water or brine.

* * * * *